United States Patent [19]

Amstutz

[11] 4,059,314
[45] Nov. 22, 1977

[54] TRACK ASSEMBLY FOR TRACKED VEHICLES

[76] Inventor: Jacob Amstutz, P.O. Box 320, Canby, Oreg. 97013

[21] Appl. No.: 662,212

[22] Filed: Feb. 27, 1976

[51] Int. Cl.² .......................................... B62D 55/30
[52] U.S. Cl. ..................................... 305/31; 305/32; 305/56
[58] Field of Search ...................... 305/22, 28, 31, 32, 305/21, 56; 267/63 R

[56] References Cited

U.S. PATENT DOCUMENTS

| | | | |
|---|---|---|---|
| 986,391 | 3/1911 | Holt | 305/56 X |
| 2,917,346 | 12/1959 | Christensen | 305/31 |
| 3,088,782 | 5/1963 | Conlan | 305/28 X |
| 3,613,810 | 10/1971 | Hetteen et al. | 305/28 X |
| 3,645,586 | 2/1972 | Piepho | 305/31 X |
| 3,790,230 | 2/1974 | Jespersen | 305/22 |

*Primary Examiner*—Robert B. Reeves
*Assistant Examiner*—John P. Shannon
*Attorney, Agent, or Firm*—Chernoff & Vilhauer

[57] ABSTRACT

A track assembly for crawler tractors and the like wherein an endless track of individual rigid pad segments connected together by chain-type links is trained about a pair of track sprockets and supports the vehicle through a plurality of frame-mounted track rollers engaging the upper surface of the lower run of the track at longitudinally spaced points between the sprockets. The front or idler sprocket is rotatably mounted in a journal box which is slidable on the vehicle frame in a direction longitudinal of the track. The journal box is biased to yieldably resist rearward sliding movement by means of a resilient elastomeric bushing adjustably coupled between the journal box and the frame such that rearward sliding of the journal box tends to compress the bushing. The plurality of frame-mounted track rollers engage the upper surface of the track's lower run by direct engagement with the rear sides of the individual rigid track pads on either side of the chain link connectors, rather than by conventional engagement with the chain links themselves, thereby minimizing any rocking or twisting of the rigid pads and increasing the stability thereof and the life of the chain link connectors.

2 Claims, 2 Drawing Figures

TRACK ASSEMBLY FOR TRACKED VEHICLES

BACKGROUND OF THE INVENTION

This invention relates to improvements in track assemblies for tracked vehicles utilizing an endless track of chain-linked rigid pads trained about a pair of track sprockets. More particularly the invention relates to an improved structure for tensioning the idler track sprocket, and improved means for engaging the upper surface of the lower run of the track with a plurality of vehicle-supporting track rollers.

Tracked vehicles such as crawler tractors, designed to operate in slippery, muddy or otherwise difficult terrain where frictional engagement with the ground is normally insufficient to provide motive power, conventionally ride on a plurality of frame-mounted track rollers which engage the upper surface of the lower run of an endless track of chain-linked rigid pads trained about a pair of longitudinally spaced track sprockets. The rigid pads are normally of metal construction and have a transverse, outwardly facing cleat or "growser", usually of outwardly tapering cross-section, designed to penetrate the bearing surface of the terrain so as to resist slippage of the track with respect to the ground. One of the track sprockets (normally the rearward one) is rotatably driven through an axle and associated drive train by the vehicle engine, while the other or "idler" sprocket is not driven but is mounted so as to reciprocate in a direction longitudinal of the track assembly and is biased in a direction away from the driven sprocket so as to place tension continuously on the track and thereby prevent undue loosening thereof as the vehicle traverses uneven terrain.

Normally the device which provides the biasing of the idler sprocket is either a coil spring or hydraulic device interposed between a longitudinally movable journal box, which supports the hub of the idler sprocket, and the frame of the vehicle. Such biasing devices, while necessary to prevent undue loosening and resultant inadvertent detachment of the track during operation, have had certain disadvantages, notably with respect to cost and reliability. With regard to cost, the steel coil springs or hydraulic devices are required to be of such size as to add significant expense to the track assembly. With regard to reliability, such biasing devices sometimes permit the track to become too loose and disengage from the sprockets when the vehicle is being driven under a heavy load in a direction opposite to that where the idler sprocket is located, for example when a vehicle having a front-mounted idler sprocket is driven in reverse direction under high drive torque. This problem stems from the fact that, under such conditions, the driven sprocket transmits the driving force through the upper run of the track around the idler sprocket to the lower run whereas, when travelling in the opposite direction, the driving force is transmitted directly from the driven sprocket to the lower run of the track. When the drive force is transmitted to the upper run of the track and around the idler sprocket, it tends to pull the idler sprocket toward the driven sprocket. The conventional coil springs or hydraulic biasing devices, which tend to resist this movement, are sometimes unable to resist the high drive force without permitting excess longitudinal movement of the idler sprocket to the point where the track may become disengaged from the sprocket, thereby disabling the machine.

Another problem common to conventional metal-tracked vehicles concerns the manner in which the frame-mounted track rollers of the vehicle engage the upper surface of the lower run of the track. Normally the track rollers are shallow-grooved rollers having side flanges on either side of the groove which engage, in a partial straddling fashion, the flexible chain-link structure mounted on the rear sides of the pads. Since the chain links are much narrower than the pads, usually occupying a transversely central location on the backs of the pads, the engagement between the track rollers and the chain links constitutes substantially no more than a fulcrum engagement whereby the pads may easily tilt sideways in either direction with respect to the rollers. This type of engagement presents several problems, including the relatively high possibility of disengagement between the track and the rollers (thereby permitting the track to be "thrown"), a concentration of vehicle weight on the chain links instead of the pads tending to cause more frequent breakage of the links, and a rocking and twisting of the pads relative to the rollers causing instability and tending further to maximize the possibility of broken links.

SUMMARY OF THE PRESENT INVENTION

The present invention is directed to a track assembly of the above-described type having individual chain-linked rigid pad segments which overcomes the aforementioned disadvantages of conventional idler sprocket biasing devices and conventional track roller engagement of the lower run of the track. In the present invention the conventional biasing structure is eliminated and replaced with a resilient elastomeric bushing adjustably interposed between the journal box of the longitudinally slidable idler sprocket and the frame of the vehicle such that longitudinal movement of the idler sprocket toward the driven sprocket is increasingly resisted by compression of the elastomeric material of the bushing. In the preferred embodiment, the bushing is mounted longitudinally between the vehicle frame and the slidable journal box and acts through a compression member of adjustable length. The elastomeric bushing provides a substantially more economical means of biasing the idler track sprocket and provides a higher resistance-to-deflection ratio than do conventional steel coil springs and hydraulic devices, thereby tending to prevent excessive idler sprocket movement and track loosening during periods when high drive torque and direction of travel combine to apply a maximum pulling force tending to move the idler sprocket longitudinally toward the driven sprocket.

The disadvantages of conventional track roller engagement with the upper surface of the lower track run are eliminated by spacing the flanges of the track rollers more widely apart transversely, and forming a deeper roller groove, than is the case with conventional track rollers so that the peripheral edges of the roller flanges forcibly engage the rear sides of the individual rigid track pads directly on either side of the chain-link connectors without any substantial force-transmitting engagement of the rollers with the chain-link connectors themselves. This arrangement eliminates the aforementioned concentration of vehicle weight on the chain-link connectors, more effectively prevents disengagement of the track from the rollers because of the more complete straddling of the chain links by the roller flanges, and also eliminates the fulcrum-type engagement of the rollers with the track by establishing a much wider transverse base of engagement, thereby reducing instability and minimizing rocking and twisting motion of the individual pads with respect to the track rollers.

It is therefore a primary objective of the present invention to provide a track assembly for tracked vehicles which utilizes a resilient elastomeric bushing to provide biasing of the idler track sprocket by compression of the elastomeric bushing material, so as to reduce cost and eliminate excessive longitudinal deflection of the idler track sprocket under drive loads.

It is a further primary objective of the present invention to provide grooved track rollers, for engaging the upper surface of the lower run of the track, having side flanges of sufficient transverse spacing and forming a groove of sufficient depth as to be capable of engaging the rear sides of the rigid track pads directly on either side of the chain-link connectors and transmitting vehicle weight through such flanges to the pads without the transmission of substantial vehicle weight through such chain-link connectors, so as to increase the useful life of the chain-link connectors, reduce the chance of track disengagement, and minimize rocking and twisting instability between the pads and track rollers respectively. The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 2:
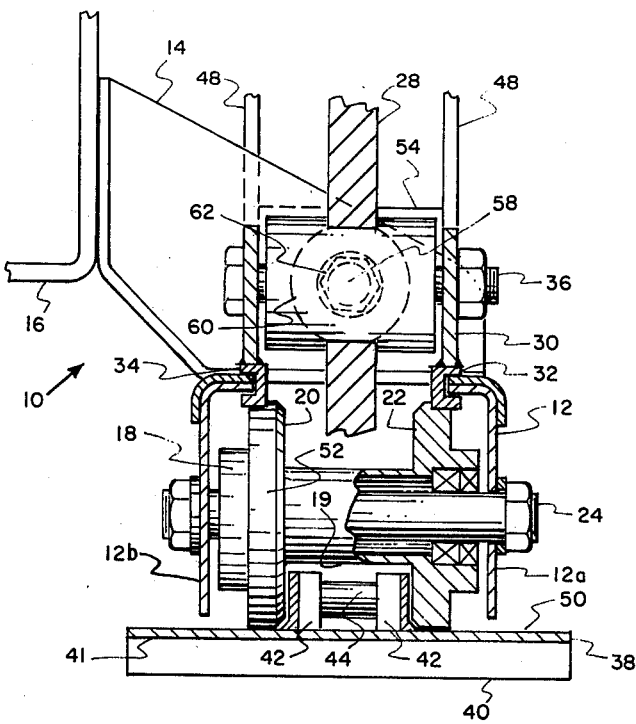
FIG. 2 is a partial sectional view of the track assembly taken along line 2—2 of FIG. 1, with portions of the idler sprocket and a track roller removed to show inner structure.

The track assembly as shown in the figures includes a basic frame portion designated generally as 10 which comprises an elongate track roller housing 12 and braces 14 which rigidly connect the roller housing 12 to the main frame 16 of the vehicle in a direction longitudinal of the vehicle. Because of its rigid connection, the frame 10 is considered simply to be part of the frame of the vehicle. As best seen in FIG. 2, the track roller housing 12 has a pair of side plates 12a, 12b between which are journaled upon transverse axles 24 a plurality of longitudinally spaced track rollers 18, each roller 50 having a pair of disc-like side flanges 20 and 22 transversely spaced from one another so as to form a groove 19 through the middle of the roller. On the rear end of the track assembly is a driven track sprocket 26 rotatably journaled to the frame of the vehicle and driven through a conventional drive train by a vehicle engine (not shown). At the front end of the track assembly an idler track sprocket 28 is rotatably journaled by transverse axle 36 in a journal box assembly 30. The journal box assembly is slidably mounted atop the track roller housing 12 for longitudinal movement forwardly and rearwardly by means of channels 32 and 34 which slidably engage the top inner edges of the side plates 12a, 12b of the track roller housing 12. Around the track sprockets 26 and 28 is trained an endless track 37 of individual rigid pads 38, preferably made of steel, each having a cleat or "growser" 40 attached transversely across the front surface 41 of the pad and protruding outwardly therefrom for penetrating the bearing surface of the terrain being traversed by the vehicle. Each pad 38 has a chain-link connector 42 of conventional design welded to the rear side thereof, such chain-link connectors being attached flexibly to one another by means of pins 44 which permit articulated motion between the respective pads. An upper grooved roller 46 having flanges of lesser depth and transverse spacing than the bottom track rollers 18 is rotatably journaled between a pair of members 48, which are rigidly attached to the top of the track roller housing 12 and extend upwardly, so as to support the upper run of the track 37 by partial straddling engagement with the chain-link connectors 42.

It will be noted from FIG. 2 that the bottom track rollers 18, having exceptionally widely spaced and deep flanges 20 and 22, straddle the chain links 42 completely, rather than partially, without substantially engaging the links and avoiding substantial transmission of vertical weight force from the vehicle frame 10 through the central groove area 19 of the rollers 18. Rather the peripheral edges of the flanges 20, 22 directly engage the rear sides 50 of the pads 38 and transmit the major vertical forces from the frame 10 directly through the flanges 20, 22 to the pads 38. To aid in this transmission of force, it will be noted that the pheripheries of the flanges 20, 22 include cylindrical surfaces 52 to provide sufficient bearing area for the transmission of vertical force through the roller flanges. It will also be noted that the flanges 20, 22, by completely straddling the chain-link connectors 42, thereby engage the rear sides 50 of the pads with an exceptionally wide transverse base of contact and thus provide excellent stability and resistance to rocking movement between the pads 38 and rollers 18. Moreover the depth of the groove 19 maximizes the degree of insertion of the chain links 42 into the groove area and thereby maximizes the retention of the chain links between the flanges 20, 22, minimizing the possibility of disengagement of the chain links from between the roller flanges.

Figure 1:
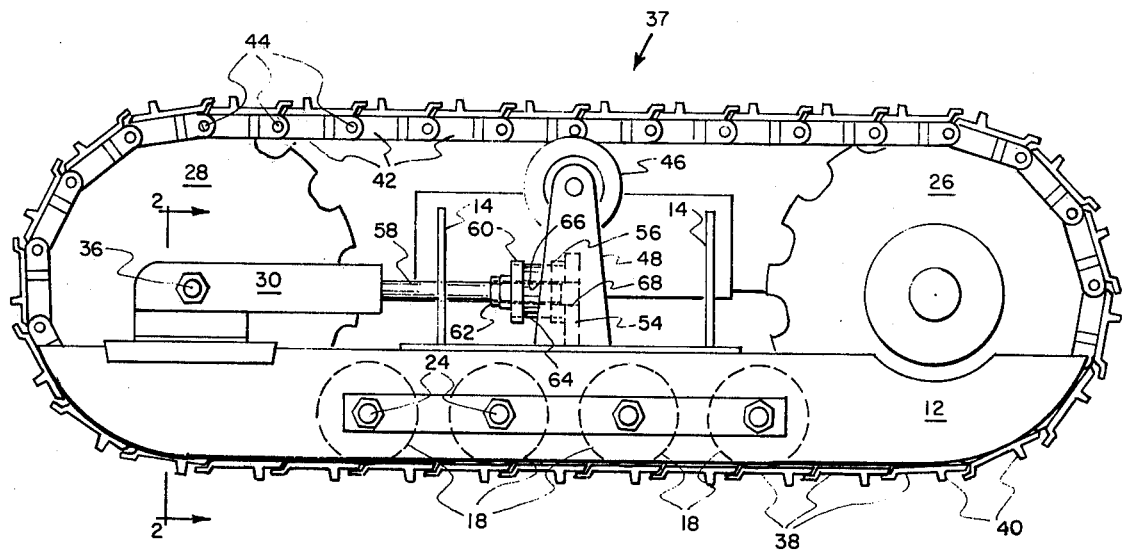
FIG. 1 is a side view of an exemplary embodiment of the track assembly of the present invention.

Extending upwardly from the track roller housing 12 between the pair of members 48, and rigidly attached thereto as a part of the frame 10, is a member 54 having a cup 56 affixed thereto facing forwardly in the direction of the idler sprocket 28. Affixed to the journal box 30 and extending rearwardly therefrom is an elongate idler sprocket compression rod 58 having a rearwardly facing mating cup 60 on the rearward extended end thereof aligned with the cup 56. A nut 62 threadably attached to the rod 58 is provided to adjust the effective length of the rod 58 between the journal box 30 and the cup 60, it being seen from FIG. 1 that an excess portion of the rod 58 protrudes rearwardly through the cup 60. Interposed between the cup 60 and the cup 56, and seated within each cup, is a resilient elastomeric bushing 64 of rubber or other suitable elastomeric material having an aperture 66 formed through the center thereof to permit the passage of the extended portion of the rod 58. It will be noted that the flange 54 also has an aperture 68 formed therein to align with the aperture 66 so as to permit passage of the extended portion of the rod 58 if necessary.

The elastomeric bushing 64 is maintained in compression by adjustment of the nut 62 which extends the active portion of the rod 58 sufficiently to keep the track 37 under tension and the bushing 64 under reactive compression between the two bushing-engaging cups 56, 60. The tension of the track, and compression of the bushing, can be varied independently of the longitudinal position of the idler sprocket 28 by adjustment of the nut 62. The nature of the compressed elastomeric bushing is such that small increases in compressive deflection, caused by movement of the idler sprocket 28 toward the driven sprocket 26, result in relatively large increases in resistance to further deflection. Accordingly, while the bushing has a sufficient longitudinal dimension to permit substantial longitudinal movement of the idler sprocket, small rearward movement of the idler sprocket 28 tending to loosen the track 37 will result in a relatively large resistance from the compressed bushing 64, thereby minimizing the amount of track loosening which can occur when the vehicle is being driven in reverse with high drive torque.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A track assembly for a tracked vehicle comprising:
   a. a vehicle frame extending longitudinally of said vehicle;
   b. first and second track sprockets journaled at longitudinally-spaced positions on said frame so as to rotate about respective axes transverse to said frame;
   c. an endless track trained about said track sprockets;
   d. journaling means having said first track sprocket journaled therein, said journaling means being movably attached to said frame for permitting said first track sprocket to reciprocate in a longitudinal direction;
   e. an elastomeric bushing of resilient elastomeric material compressively interposed between said journaling means and said vehicle frame for permitting the movement of said first track sprocket longitudinally in a direction toward said second track sprocket while resisting said movement by a reactive compressive force of said elastomeric material variable in response to the degree of said longitudinal movement;
   f. said journaling means having a compression member extending therefrom toward said second sprocket, said compression member having first bushing engagement means mounted adjacent its extended end facing said second sprocket for engaging one side of said elastomeric bushing and threaded means for adjusting the longitudinal position of said first bushing engagement means on said extended end of said compression member, said vehicle frame having a mating bushing engagement means mounted thereon facing said first bushing engagement means for engaging the opposite side of said bushing, said elastomeric bushing being located between said two bushing engagement means.

2. The track assembly of claim 1 including means defining a longitudinally oriented aperture within said elastomeric bushing aligned with said compression member for accepting said extended end of said compression member.

* * * * *